(12) United States Patent
Huettlin

(10) Patent No.: US 7,849,832 B2
(45) Date of Patent: Dec. 14, 2010

(54) ROTARY PISTON MACHINE

(76) Inventor: Herbert Huettlin, Daimlerstrasse 7, D-79585 Steinen (DE)

( * ) Notice: Subject to any disclaimer, the term of this patent is extended or adjusted under 35 U.S.C. 154(b) by 0 days.

(21) Appl. No.: 12/702,988

(22) Filed: Feb. 9, 2010

(65) Prior Publication Data
US 2010/0199947 A1  Aug. 12, 2010

Related U.S. Application Data

(63) Continuation of application No. PCT/EP2008/006625, filed on Aug. 12, 2008.

(30) Foreign Application Priority Data
Aug. 13, 2007  (DE) .................. 10 2007 039 309

(51) Int. Cl.
*F02B 57/00* (2006.01)
(52) U.S. Cl. .............. 123/226; 123/223; 123/45 R; 123/205; 123/210
(58) Field of Classification Search .......... 123/43 R, 123/45 R, 205, 210, 223, 226, 277
See application file for complete search history.

(56) References Cited
U.S. PATENT DOCUMENTS
2,018,306 A * 10/1935 Hunt ..................... 123/226
(Continued)

FOREIGN PATENT DOCUMENTS
DE  1776095 A1  8/1970
(Continued)

OTHER PUBLICATIONS

International Search Report and Written Opinion of the International Searching Authority; PCT/EP2008/006625; Nov. 19, 2008; 13 pages.

(Continued)

*Primary Examiner*—Eric Solis
(74) *Attorney, Agent, or Firm*—St. Onge Steward Johnston & Reens LLC

(57) ABSTRACT

A rotary piston machine has a housing in which are arranged at least two pistons which are able to revolve together in the housing about an axis of rotation which is fixed with respect to the housing, the pistons being mounted slidingly in a piston cage which is mounted in the housing and revolves together with the pistons about the axis of rotation, the two pistons executing mutually opposing reciprocating motions while revolving about the axis of rotation in order alternately to increase and decrease the volume of a working chamber defined by end faces oriented towards one another of the two pistons and by the piston cage, the axis of rotation passing through the working chamber and the piston cage having a gas exchange opening for admitting and discharging gas to and from the working chamber. The gas exchange opening is arranged on the axis of rotation and a closing member is arranged in the gas exchange opening, which is connected to the piston cage in a rotationally fixed manner with respect to the axis of rotation and is axially movable relative to the piston cage in the direction of the axis of rotation in order to open and close the gas exchange opening, there being present a control mechanism for the closing member which derives the axial motion of the closing member from the rotary motion of the closing member about the axis of rotation.

21 Claims, 12 Drawing Sheets

U.S. PATENT DOCUMENTS

| | | | |
|---|---|---|---|
| 3,429,301 A * | 2/1969 | Sandidge | 123/227 |
| 4,617,886 A * | 10/1986 | Mach | 123/223 |
| 5,305,716 A | 4/1994 | Huettlin | |
| 6,311,668 B1 | 11/2001 | Milam | |
| 6,688,276 B2 * | 2/2004 | Baptista et al. | 123/226 |
| 6,761,143 B1 * | 7/2004 | Itoh et al. | 123/227 |
| 2005/0199189 A1 | 9/2005 | Malinov | |
| 2006/0191499 A1 | 8/2006 | Huettlin | |

FOREIGN PATENT DOCUMENTS

| | | |
|---|---|---|
| DE | 3812988 A1 | 11/1989 |
| DE | 4123176 C1 | 8/1992 |
| FR | 2332282 A1 | 6/1977 |
| GB | 2337562 A | 11/1999 |
| WO | 2006089576 A1 | 8/2006 |
| WO | 2006128545 A1 | 12/2006 |

OTHER PUBLICATIONS

International Preliminary Report on Patentability and Translation of the Written Opinoin of the International Searching Authority; PCT/EP2008/006625; Mar. 2, 2010; 7 pages.

* cited by examiner

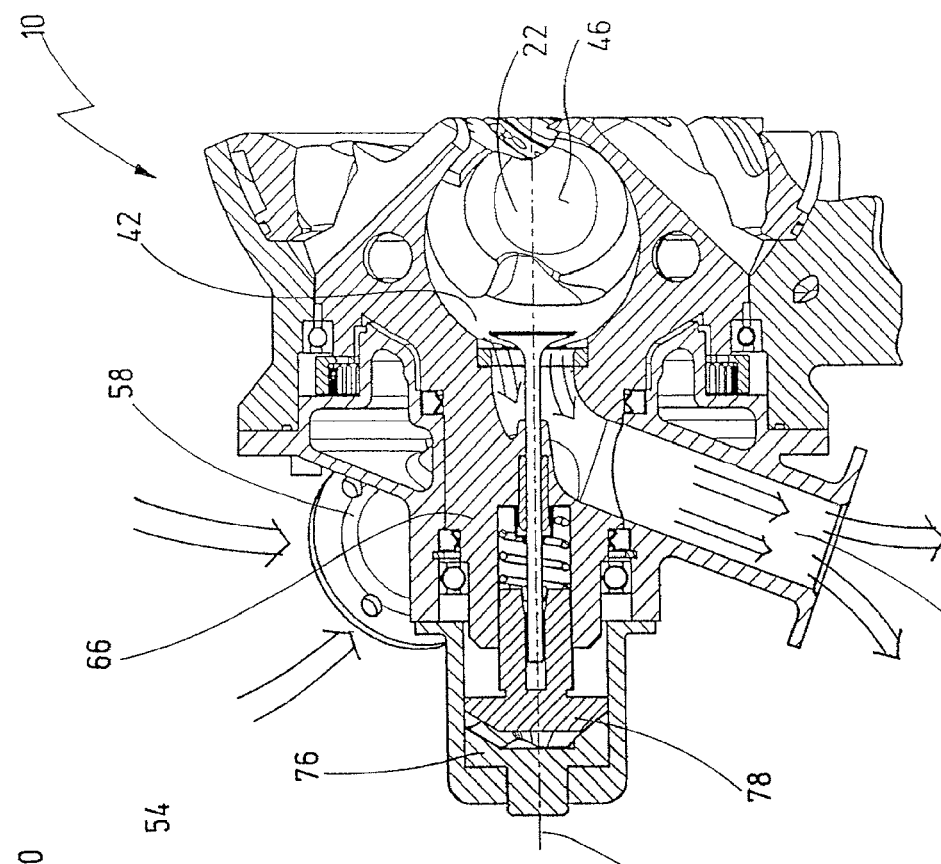
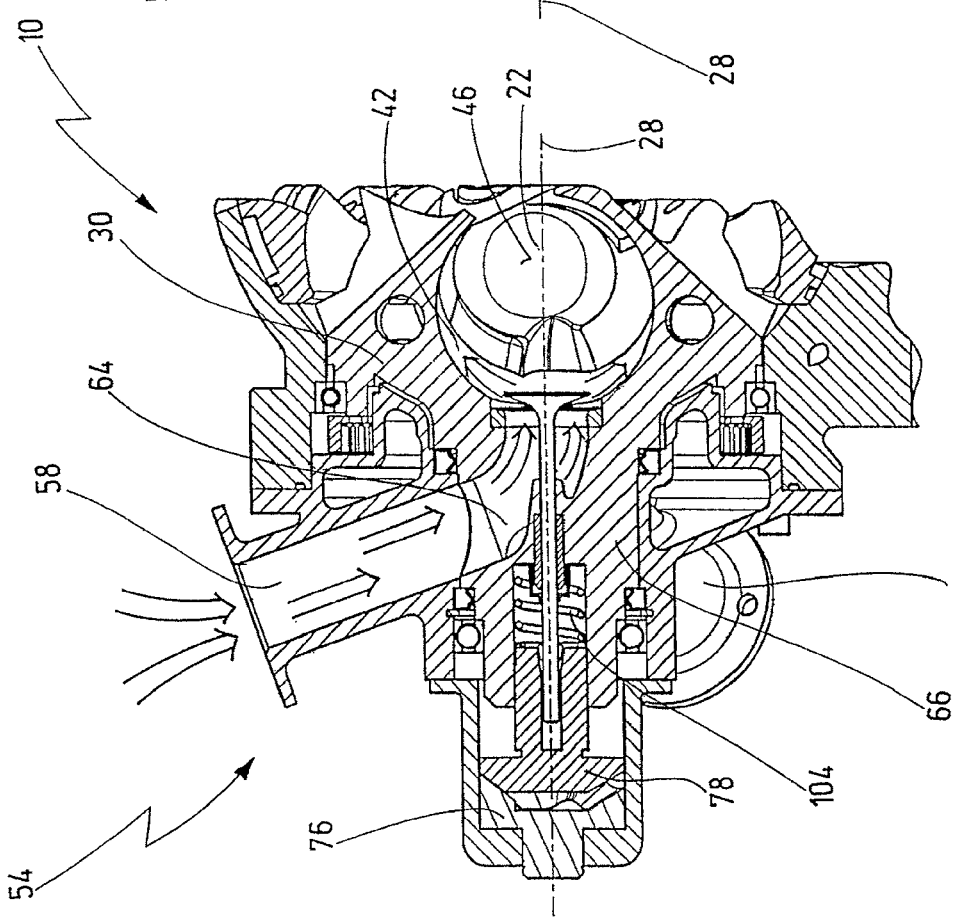
Fig.4
Fig.5

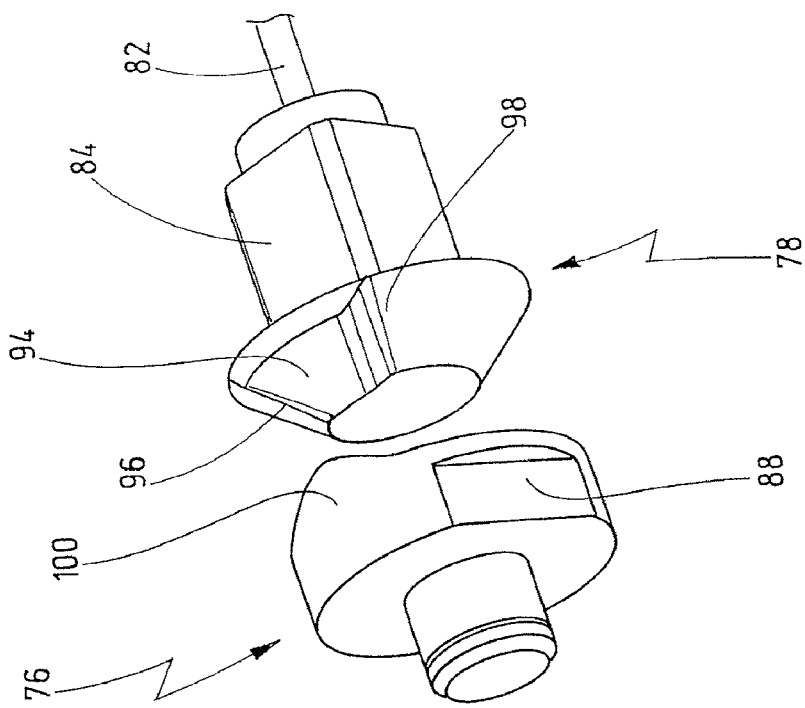
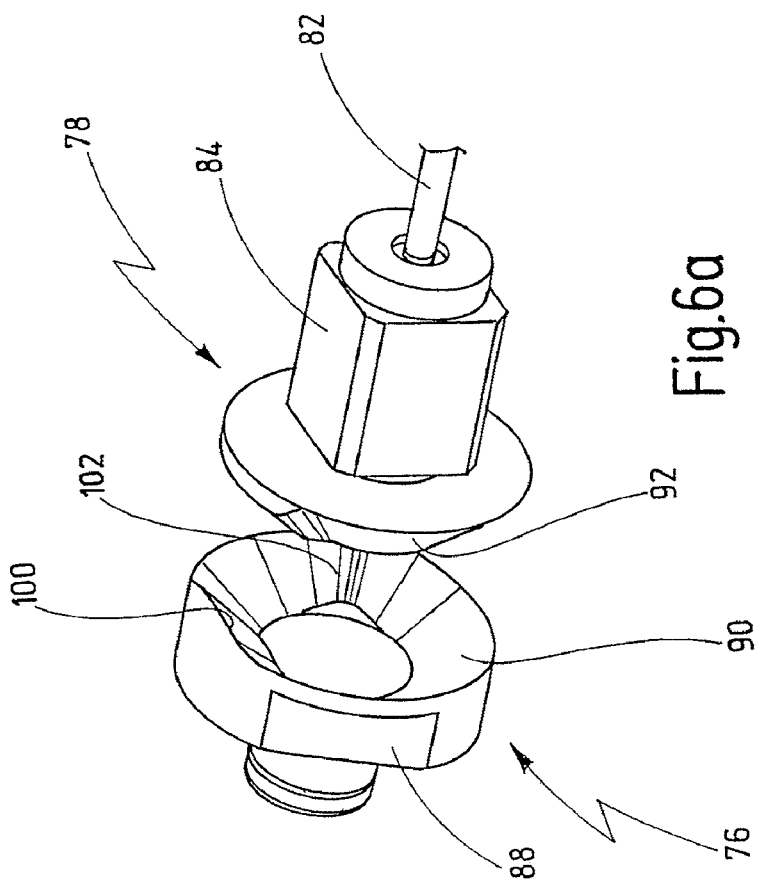

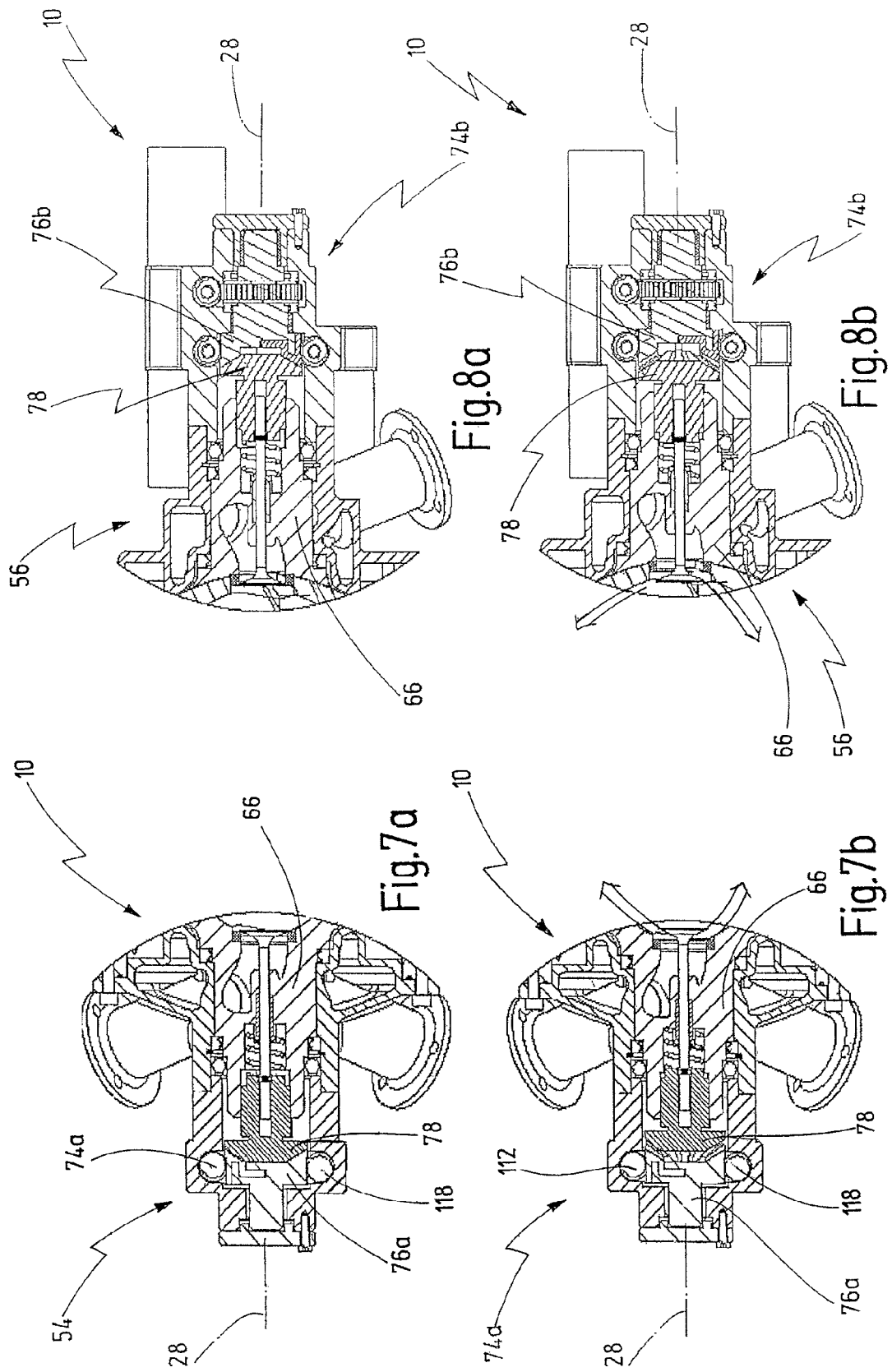

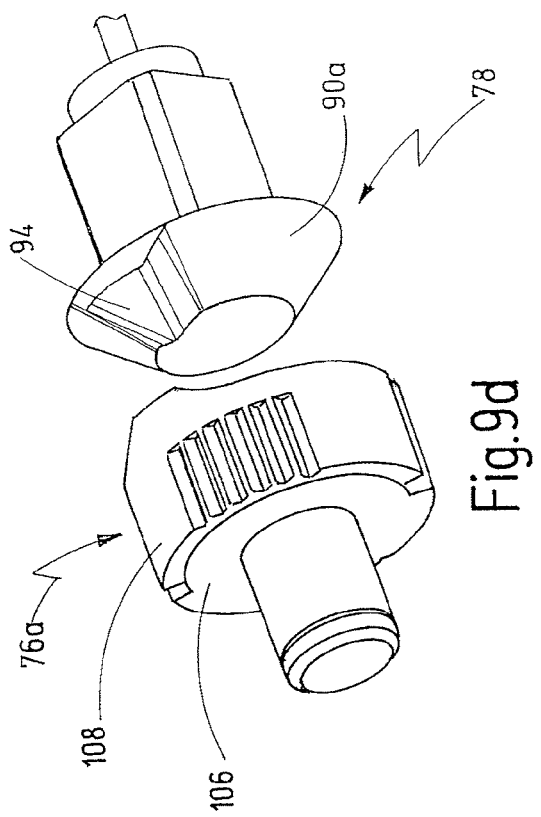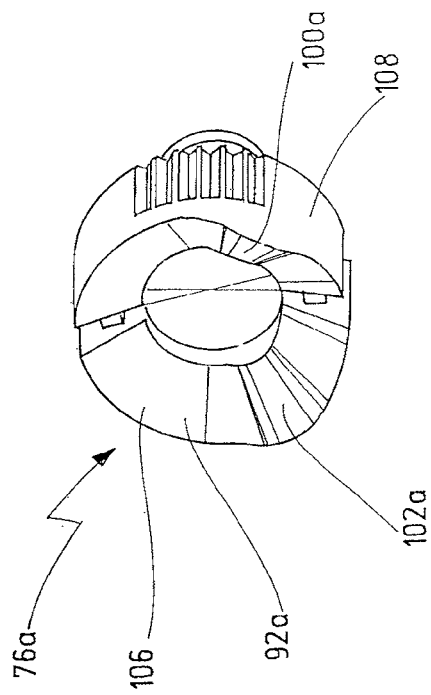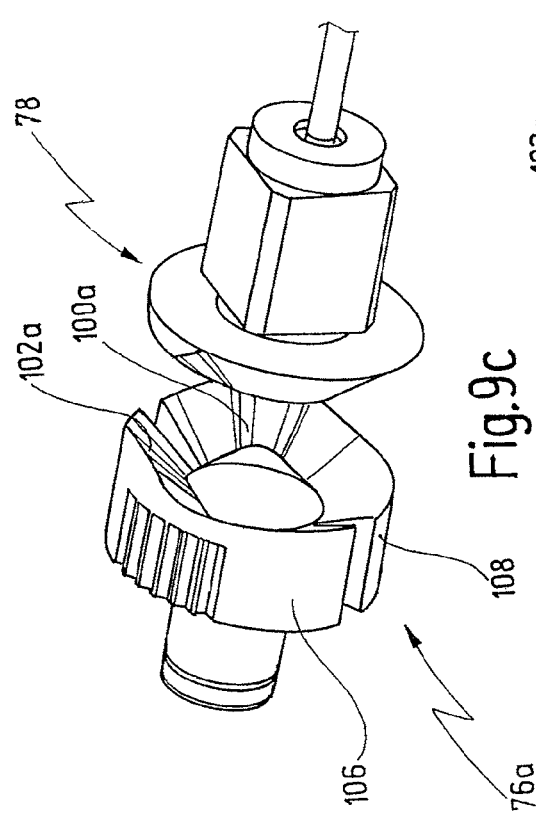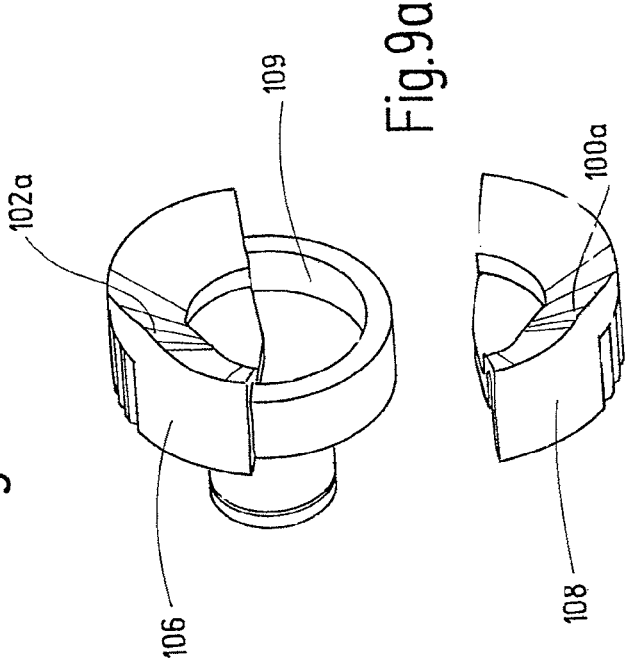

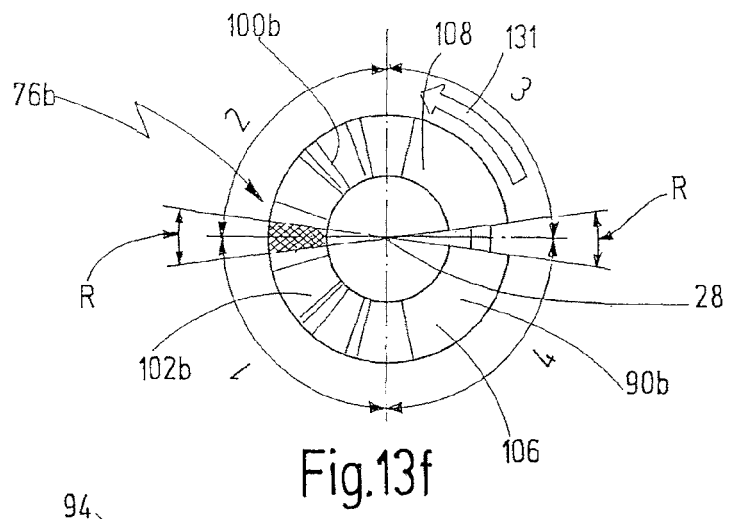
Fig.13f
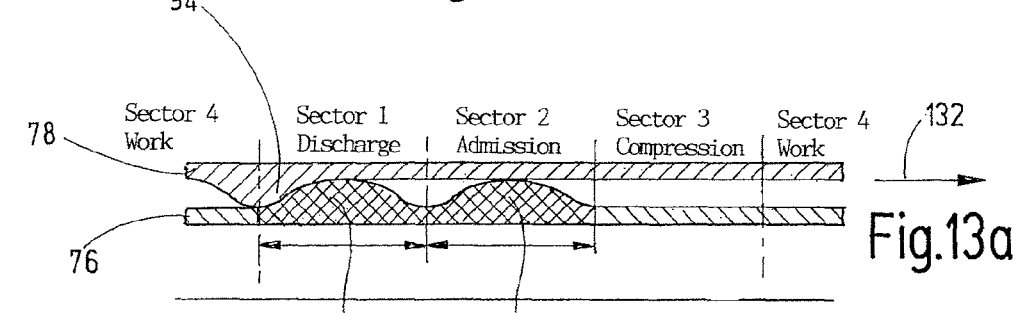
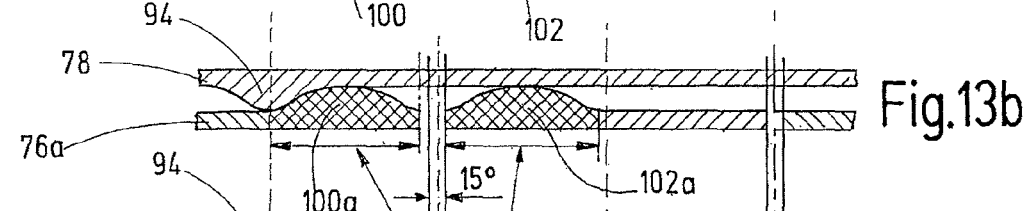
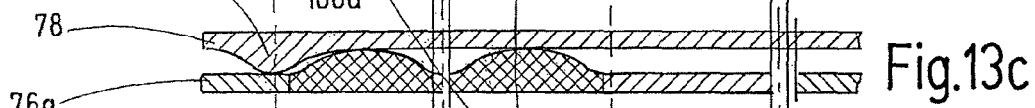
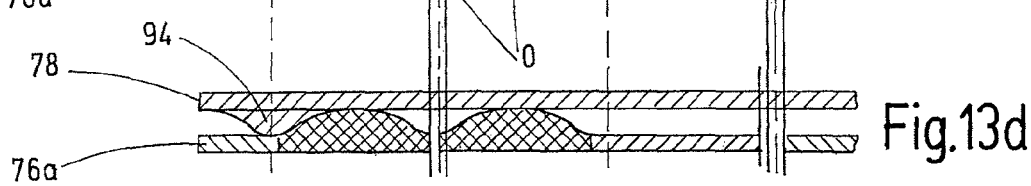
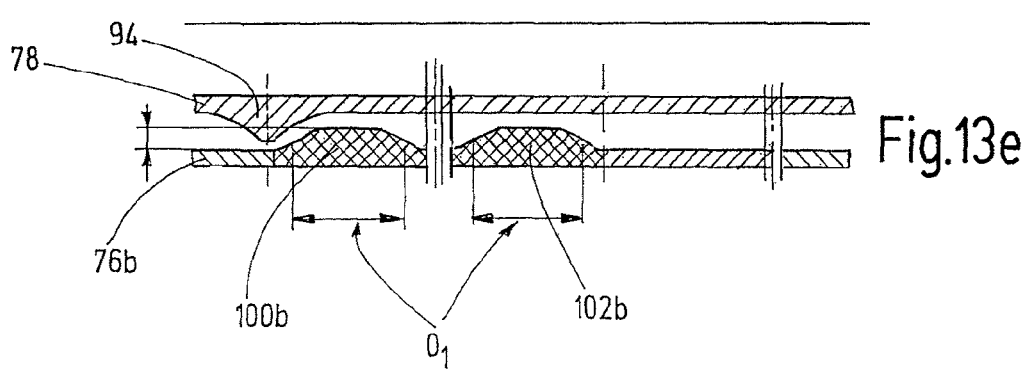

ROTARY PISTON MACHINE

CROSS REFERENCE TO RELATED APPLICATIONS

The present application is a continuation of pending International patent application PCT/EP2008/006625 filed on Aug. 12, 2008 which designates the United States and which claims priority of German patent application No. 10 2007 039 309.3 filed on Aug. 13, 2007.

BACKGROUND OF THE INVENTION

The invention generally relates to rotary piston machines.

Specifically, the invention relates to rotary piston machines of the type comprising a housing in which at least two pistons are arranged, which are able to revolve together in the housing about an axis of rotation which is fixed with respect to the housing. The pistons are mounted slidingly in a piston cage which is mounted in the housing and revolves together with the pistons about the axis of rotation, wherein the two pistons execute mutually opposing reciprocating motions while revolving about the axis of rotation in order to alternately increase and decrease the volume of a working chamber defined by end faces of the two pistons which are oriented towards one another, and by the piston cage. The axis of rotation runs through the working chamber. The piston cage has a gas exchange opening for the admission and discharge of gas to and from the working chamber.

A rotary piston machine according to the present invention can be used as an internal combustion engine (combustion engine), a pump or a compressor.

In the case when such a rotary piston machine is used as an internal combustion engine, the individual working cycles of induction, compression and ignition of the combustible mixture, and expansion and exhaust of the burnt combustible mixture, are effected by reciprocating motions of at least two pistons between two end positions, the motions of the pistons being derived from their rotary motion about the axis of rotation.

In the case when such a rotary piston machine is used as a compressor the operation is similar, although no combustion process, and accordingly no ignition of a combustible mixture, takes place in the rotary piston machine, and a gas, in particular air, is merely highly compressed.

A rotary piston machine known from WO 2006/089576 A1 has in the housing four pistons which, together with the piston cage, define two working chambers which are arranged opposite one another along the axis of rotation and are oriented towards the end faces of the housing. The cycles of induction, compression, expansion and exhaust take place in each of the two working chambers. In the case when this known rotary piston machine is used as an internal combustion engine, the two working chambers are increased and decreased in the same sense, the cycle sequence of induction, compression, expansion and exhaust being phase-shifted by two cycles from the one working chamber to the other working chamber. In the case when this known rotary piston machine is used as a compressor, the two working chambers are increased and decreased in opposite directions, that is, while the one working chamber is being decreased in volume the other working chamber is increasing in volume.

In both cases the axis of rotation about which the pistons revolve and which, within the meaning of the present description, is to be understood as a geometric axis, runs through both working chambers.

Associated with each of the two working chambers of the known rotary piston machine is a respective gas inlet opening and a respective gas outlet opening in the housing. In the piston cage a respective gas exchange opening is present for each working chamber; each gas exchange opening opens into the respective working chamber and, with each revolution of the piston cage about the axis of rotation, communicates temporarily with the respective gas inlet opening or gas outlet opening, so that a gas exchange can take place into or out of the respective working chamber when the gas exchange opening in the piston cage overlaps with the gas inlet opening or the gas outlet opening in the housing. Over the remaining angular range of rotation of the piston cage about the axis of rotation, the piston cage closes the gas inlet openings and the gas outlet openings in the housing in a gas-tight manner, so that the gas admitted to the particular working chamber—a fuel-air mixture in the case of an internal combustion engine—can be compressed and ignited and can work.

Within the meaning of the present invention the term "gas" should be understood in a general sense and includes, for example, air, a fuel-air mixture, burnt fuel-air mixture or any other fluid.

In the known rotary piston machine the gas exchange opening is arranged in the piston cage laterally or radially at a distance from the axis of rotation.

The advantage of the known rotary piston machine is that no valves are required for the gas exchange between the working chamber or chambers, because the opening and closing of the gas exchange opening is effected solely by the rotation of the piston cage in the housing.

By contrast, in the field of linearly-reciprocating piston engines there is very good experience in controlling the gas exchange into and out of the working chambers of the cylinders by means of valves, in particular so-called tulip valves.

However, rotary disc valve systems for controlling the gas exchange, which present themselves as technically very simple solutions for rotary position machines, in particular for spherical engines such as the known rotary piston machine, are regarded with misgivings in technical circles because relevant experience with such gas exchange control systems over many years is lacking.

SUMMARY OF THE INVENTION

It is therefore the object of the present invention to make available a rotary piston machine of the type mentioned in the introduction in which the gas exchange can be controlled with a valve, in particular a conventional tulip valve.

According to the invention, a rotary piston machine is provided, comprising a housing, at least two pistons arranged in the housing and being able to revolve together in the housing about an axis of rotation which is fixed with respect to the housing; a piston cage arranged in the housing, in which the at least two pistons are mounted slidingly, the piston cage revolving together with the at least two pistons about the axis of rotation, the at least two pistons executing mutually opposing reciprocating motions while revolving about the axis of rotation in order to alternately increase and decrease the volume of a working chamber defined by end faces of the at least two pistons which are oriented towards one another, and by the piston cage, the axis of rotation running through the working chamber; the piston cage having a gas exchange opening for the admission and discharge of gas to and from the working chamber, the gas exchange opening being arranged on the axis of rotation; a closing member arranged in the gas exchange opening which is connected to the piston cage in a rotationally fixed manner with respect to the axis of rotation and being axially movable relative to the piston cage in direction of the axis of rotation in order to open and close the gas exchange opening; and a control mechanism for the closing member which derives an axial motion of the closing member from a rotary motion of the closing member about the axis of rotation.

Through the invention there is now made available a rotary piston machine, as known, for example from the document WO 2006/089576 A1, with valve-controlled gas exchange. To achieve this, the gas exchange opening in the piston cage was first moved to the axis of rotation, as compared to the known rotary piston machine, so that the axis of rotation, imagined as a geometric axis, runs through the gas exchange opening in the piston cage. Arranged in this axially disposed gas exchange opening, according to the invention, is a closing member which is connected to the piston cage in a rotationally fixed manner with respect to the axis of rotation and which therefore revolves with the piston cage about the axis of rotation. This advantageously has the effect that the closing member does not execute any relative movement with respect to the piston cage in the direction of rotation about the axis of rotation, so that no sealing problems arise in the closed position of the closing member, in which the latter rests against the edge of the gas exchange opening in the piston cage. In order to open the gas exchange opening by means of the closing member, and to close the gas exchange opening by means of the closing member, the latter is axially movable relative to the piston cage in the direction of the axis of rotation. In addition, there is provided according to the invention a control mechanism, that is, a valve control system, for the closing member, which derives the axial motion of the closing member from the rotary motion of the closing member about the axis of rotation. An automatic control of the opening and closing of the closing member which is continuously adapted to the rotational speed of the rotary piston engine, as in the case of conventional linearly-reciprocating piston engines, is thereby advantageously achieved, without a complex electronic control system being required for this purpose. A control system of this type is comparable to the traditional camshaft control of valves in conventional linearly-reciprocating piston engines.

In a preferred configuration the closing member is in the form of a disc valve, in particular a tulip valve, the valve disc of which rests against a valve seat formed inside the piston cage in the closed position and which is movable in the direction into the working chamber in order to open the gas exchange opening.

In this configuration the rotary piston machine according to the invention makes use of a disc valve, in particular a tulip valve, which has proved widely effective in engine technology. Through the arrangement of the valve seat inside the piston cage, the disc valve is pressed firmly against the valve seat in its closed position as the gas is compressed in the working chamber, so that optimum gas-tightness is achieved. The same is true in the case of use of the rotary piston machine as an internal combustion engine, during ignition and expansion (the work).

In a further preferred configuration, the control mechanism comprises at least one control cam fixed to the closing member and at least one control cam fixed to the housing and cooperating with the control cam fixed to the closing member, in such a manner that the closing member is moved from its closed position to the open position as the control cam fixed to the closing member moves along the control cam fixed to the housing.

With this configuration a constructionally simple mechanical control system for the closing member is produced in order to derive the axial movement of the closing member for closing and opening thereof from the rotary motion of the closing member about the axis of rotation. This is because the control cam fixed to the closing member is moved about the axis of rotation together with the closing member at the same speed. As the control cam fixed to the closing member moves along the control cam fixed to the housing, the closing member is pushed to the open position.

According to a further configuration of the invention, the return of the closing member to the closed position is preferably effected by an energy storage element, for example a spring, which presses the closing member back from the open position to the closed position.

To sum up, a purely mechanical control of the closing member adapted to rotational speed is thereby achieved.

In a development of the aforementioned configuration, the control mechanism has one control cam fixed to the closing member and two control cams fixed to the housing and arranged at a distance from one another in the circumferential direction, or two control cams fixed to the closing member and arranged at a distance from one another in the circumferential direction and one control cam fixed to the housing.

In this configuration, the closing member is opened and closed twice during each complete revolution about the axis of rotation, one period of opening serving to admit gas to the working chamber and the other period of opening serving to discharge gas from the working chamber. In the rotary piston machine according to the invention, in contrast to conventional linearly-reciprocating piston engines, only one closing member is required in principle for the admission and discharge of gas, whereas separate valves with separate control mechanisms are provided for gas admission and gas discharge in conventional linearly-reciprocating piston engines.

In a constructionally especially simple configuration, the at least one control cam fixed to the closing member is formed in a margin region of a planar control element fixed to the closing member, and the at least one control cam fixed to the housing is arranged in a margin region of a planar control element fixed to the housing and located opposite the planar control element fixed to the closing member.

The arrangement of the control cams in margin regions of planar, for example disc-shaped, control elements, the surfaces of which carrying the control cams extend substantially transversely to the axis of rotation, has the advantage that the axis of rotation itself remains free, in order, for example, to make possible an injection of fuel, for example through the stem or tappet portion of the closing member, at the rearward end of which the planar control element fixed to the closing member is arranged, if the rotary piston machine according to the invention is to be used as an internal combustion engine. The particular control cam is preferably formed on the respective planar control element as an axial elevation with limited extension in the circumferential direction around the axis of rotation, that is, in the form of undulatory, for example sinusoidal, elevations.

In this case it is further preferred if the planar control element fixed to the housing has a concavely tapered control surface and the planar control element fixed to the closing member has a convexly tapered control surface substantially complementary thereto, the control cams being formed on these control surfaces.

An advantage of this configuration is that the control element fixed to the housing and the control element fixed to the closing member are guided on one another via the control surfaces configured in a complementary fashion. A further advantage is that the control cams are located on surfaces disposed obliquely with respect to the axis of rotation, which assists the conversion of the rotary motion into an axial motion.

In a further preferred configuration the control mechanism is adjustable in order to change the time of opening and/or the time of closing of the closing member.

As is known, the power of an internal combustion engine is dependent on rotational speed, and recognition of this is also taken into account in the rotary piston machine according to the invention by the above-described measure, in that the time of opening and/or the time of closing of the closing member can be changed as a function of load and rotational speed by means of the control mechanism which produces the axial movement of the closing member.

In a constructionally simple implementation of this aspect, it is preferred if the at least one control cam fixed to the housing is positionally adjustable in a circumferential direction about the axis of rotation.

Through the positional adjustment of the at least one control cam fixed to the housing in the circumferential direction about the axis of rotation, it is effected that the angle of rotation, and therefore the times at which the at least one control cam fixed to the housing and the at least one control cam fixed to the closing member come into engagement and move out of engagement with one another, are changed. This time of the engagement and disengagement determines the time of the opening and closing of the closing member.

Such a positional adjustment can be implemented, for example, by making the above-mentioned control element, on which the at least one control cam fixed to the housing is formed, rotatable over a limited angular range in a circumferential direction about the axis of rotation, and by providing a suitable rotary drive for the control element.

In the context of the above-mentioned configuration, according to which the control mechanism comprises one control cam fixed to the closing member and two control cams fixed to the housing and arranged at a distance from one another in a circumferential direction, it is preferably provided that both control cams fixed to the housing are positionally adjustable in the circumferential direction, the two control cams fixed to the housing preferably being positionally adjustable independently of one another.

In this case it is advantageous that both the start and/or the end of gas admission and the start and/or the end of gas discharge can be adjusted, preferably independently of one another, whereby the power characteristics of the rotary piston machine according to the invention are further improved in the case when it is used as an internal combustion engine.

In a configuration which is of technically simple design and therefore advantageous, this is achieved in that the above-mentioned control element fixed to the housing has two segments, which each have one of the control cams fixed to the housing, the two segments being positionally adjustable relative to one another and/or jointly in a circumferential direction around the axis of rotation.

In this configuration the control element fixed to the housing therefore has a two-part configuration, each of these two parts carrying a control cam, and the time of opening and/or the time of closing of the closing member, both for the gas admission process and for the gas discharge process, can then be changed by positional adjustment of the two parts.

In a further preferred configuration the control mechanism is adjustable in order to change the duration of the open state of the closing member.

By means of the duration of the open state of the closing member, in particular the quantity of gas admitted to the working chamber can advantageously be adapted as a function of the rotational speed of the rotary piston machine in order to achieve optimum power characteristics. The mixture ratio of fresh air (combustion air) and fuel (in the case when the rotary piston machine is used as an internal combustion engine) can therefore be lowered when the power demand is low by admitting less fresh air to the working chamber, the duration of opening of the closing member being reduced. When the power demand is high, by contrast, a higher mixture ratio of fresh air and fuel is needed, which is effected by a longer opening period of the closing member.

In a further preferred configuration the control mechanism is adjustable in order to change the lift of the closing member between the closed position and the open position.

Through the adjustability of the opening lift of the closing member between the closed position and the open position, the quantity of gas admitted to the working chamber can also be changed, because the lift of the closing member influences the flow rate of the inflowing gas.

In a configuration of advantageously simple design with which the two aforementioned adjustments can be made, the at least one control cam fixed to the housing is axially adjustable in the direction of the axis of rotation relative to the at least one control cam fixed to the closing member.

If the at least one control cam fixed to the housing is moved away from the at least one control cam fixed to the closing member, so that the time of coming into mutual engagement of the two undulatory control cams is later and the time of disengagement is correspondingly earlier, the duration of the open state of the closing member is correspondingly shortened. At the same time, the lift of the closing member between the closed position and the open position is also reduced. By means of suitable axial movement of the at least one control cam fixed to the housing towards the at least one control cam fixed to the closing member, the duration of the open state of the closing member is correspondingly increased, as is the lift of the closing member.

In order to implement the positional adjustment of the at least one control cam fixed to the housing, an axial drive, which moves the control element fixed to the housing correspondingly towards or away from the control element fixed to the closing member in the direction of the axis of rotation, may be provided on the above-mentioned control element fixed to the housing.

In a further preferred configuration the gas exchange opening is formed in an axial extension of the piston cage, which gas exchange opening opens into a channel in the extension which leads laterally outwards from the extension and communicates alternately with a gas inlet opening in the housing and with a gas outlet opening in the housing as the piston cage rotates.

The channel in the extension is therefore located on the side of the closing member oriented away from the working chamber, which has the advantage that no significant pressures, which might lead to sealing problems, are built up in the channel and in the region of the gas inlet opening and the gas outlet opening in the housing.

In a further preferred configuration a fuel injection device is arranged in the closing member.

In this case it is advantageous that, in the case when the rotary piston machine according to the invention is used as an internal combustion engine, a fuel can be injected directly into the working chamber, advantageously on the axis of rotation and therefore into the center of the working chamber, despite the presence of the closing member.

In a further preferred configuration an ignition device for igniting a gas in the working chamber is arranged in the closing member.

This configuration is especially suitable for a use of the rotary piston machine according to the invention as an internal combustion engine which can be operated with spark-ignition fuel (gasoline), with the further advantage, as with the aforementioned configuration, that the ignition of the fuel-air mixture takes place centrally in the working chamber.

Further advantages and features are apparent from the following description and the appended drawing.

It is self-evident that the features mentioned hereinbefore and to be explained hereinafter can be used not only in the particular combination specified but also in other combinations or in isolation, without departing from the scope of the present invention.

BRIEF DESCRIPTION OF THE DRAWINGS

Exemplary embodiments of the invention are represented in the drawing and are described in more detail below with reference thereto. In the drawing:

FIG. 4 shows the portion in FIG. 3 in a longitudinal section along a plane which passes through a gas inlet, the pistons of the rotary piston machine being shown in different movement positions as compared to FIG. 3;

FIG. 5 shows the portion in FIG. 3 in a longitudinal section along a plane which passes through a gas outlet of the rotary piston machine, the pistons of the rotary piston machine being in a changed movement position as compared to FIG. 3;

FIGS. 6a) and b) show details of a control mechanism for a closing member of the gas exchange system of the rotary piston machine in the embodiment according to FIG. 3 in two perspective views;

FIGS. 7a) and b) show details comparable to FIG. 3 of a rotary piston machine according to the invention in two operating positions according to a further exemplary embodiment of the gas exchange system;

FIGS. 8a) and b) show a further portion of a rotary piston machine in longitudinal section in two operating positions according to yet a further exemplary embodiment of the gas exchange system;

FIGS. 9a) to d) show representations comparable to FIG. 6 of a control mechanism for a closing member of the gas exchange system of the rotary piston machine according to FIGS. 7a) and b) in four different perspective representations;

FIGS. 13a) to f) are schematic representations of the gas exchange control system of a rotary piston machine according to the invention;

DETAILED DESCRIPTION OF PREFERRED EXEMPLARY EMBODIMENTS

Figure 1:
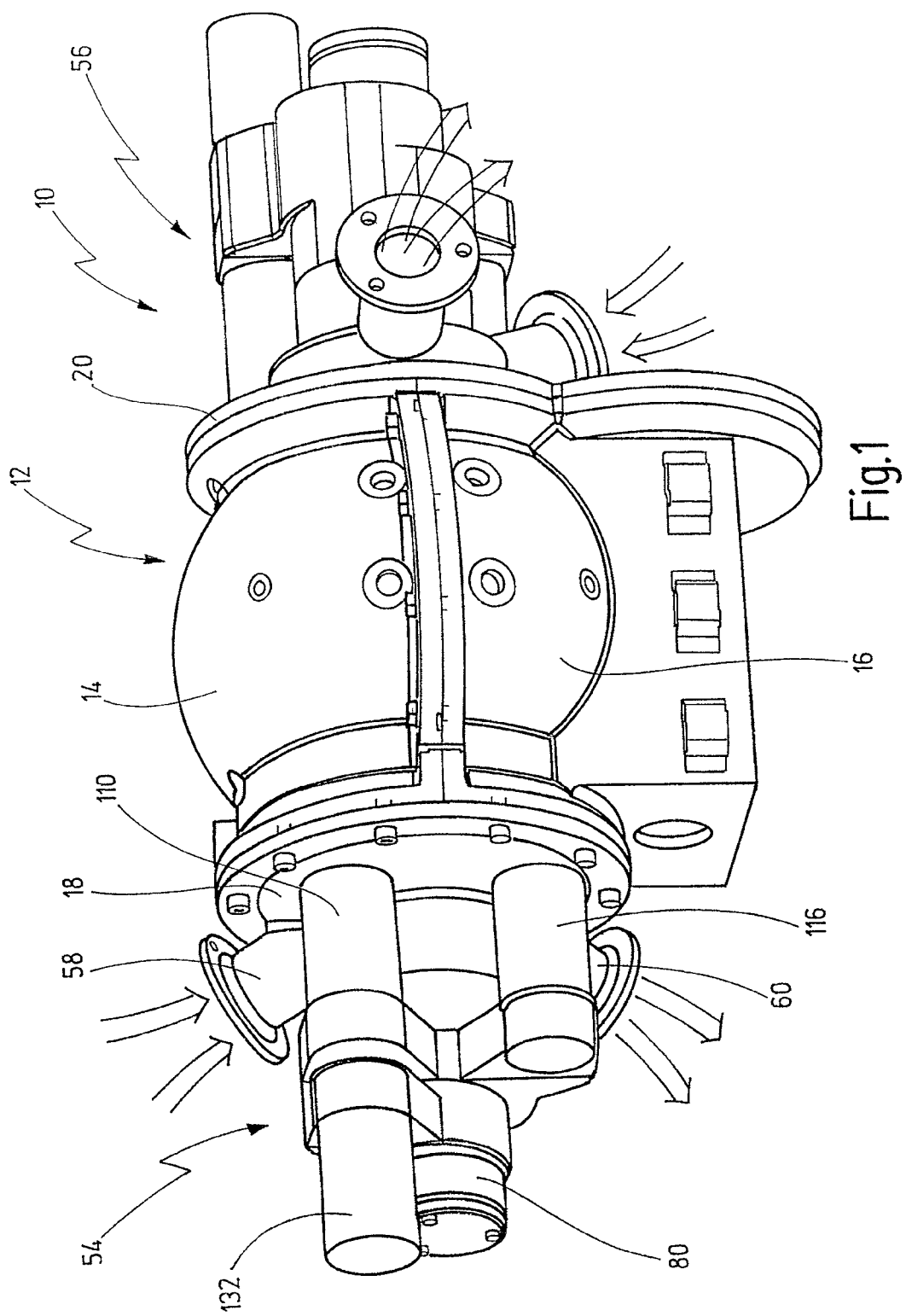
FIG. 1 shows a rotary piston machine according to the invention in an overall perspective view.

FIGS. 1 to 5 show a rotary piston machine denoted by the general reference numeral 10.

The rotary piston machine 10 may be designed as an internal combustion engine (combustion engine), but also as a compressor.

The rotary piston machine 10 has the general form of a spherical engine or spherical compressor with an internally substantially spherical housing 12. In FIG. 1 the housing 12 is shown closed, while in FIGS. 2 to 5 the interior of the housing 12 is shown according to the sectional representations in those figures.

The housing 12 is formed substantially by two housing main parts 14 and 16 and two housing end covers 18 and 20. The housing end covers 18 and 20 are removable from the housing main parts 14 and 16, just as the two housing main parts 14 and 16 are removable from one another, the fastening of the aforementioned parts to one another being effected by means of screws.

Figure 2:
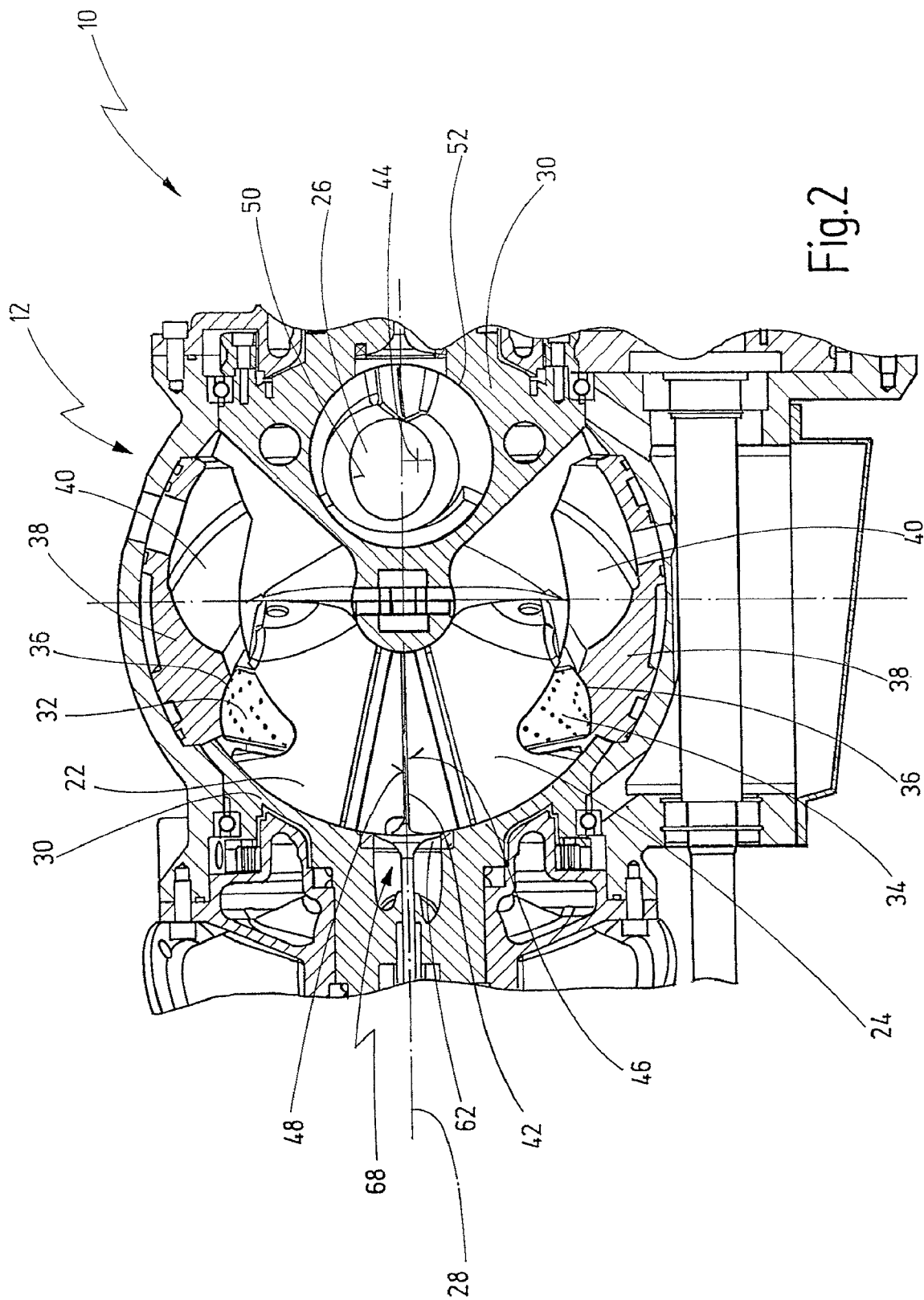
FIG. 2 shows a portion of the rotary piston machine in FIG. 1 in a longitudinal section.

Arranged in the housing 12 are a total of four pistons, only three of which can be seen in the drawing, namely a first piston 22, a second piston 24, a third piston 26 and a fourth piston (not shown) which is located in front of the drawing plane in FIG. 2 opposite the third piston 26.

The pistons 22, 24, 26 and the fourth piston (not shown) together run in the housing 12 about an axis of rotation 28 which is fixed with respect to the housing. The axis of rotation 28 is to be understood as a geometric axis and runs through the center of the housing.

In relation to the axis of rotation 28 the pistons 22 and 24 are arranged in the housing 12 offset by 90° with respect to the piston 26 and the fourth piston, although the third piston 26 and the fourth piston may also be arranged in the same plane as the pistons 22 and 24, as illustrated and described in the document WO 2006/089576 A1, reference being made to this document for a more detailed description, in particular with regard to the geometry of the pistons.

The pistons 22, 24, 26 and the fourth piston (not shown) are arranged and mounted slidingly in a piston cage 30, which is itself mounted rotatably about the axis of rotation 28 in the housing 12. With respect to the axis of rotation 28, the pistons 22, 24, 26 and the fourth piston are connected in a rotationally fixed manner to the piston cage 30, but are able to execute relative to the latter reciprocating movements substantially perpendicular to the axis of rotation 28 between two end positions, as they revolve about the axis of rotation 28 together with the piston cage 30 in the housing 12. For this purpose the pistons 22, 24, 26 and the fourth piston are mounted slidingly in the piston cage 30.

In order to derive the reciprocating motions of the pistons 22, 24, 26 and the fourth piston from the rotary motion thereof about the axis of rotation 28, at least one respective running member is associated with each of the pistons 22, 24, 26 and the fourth piston, as is represented in FIG. 2 for a running member 32 of the piston 22 and a running member 34 of the piston 24. The third piston 26 and the fourth piston also have corresponding running members, which, in accordance with the representation used, are not be seen in the drawing. The running members 32 and 34 of the pistons 22 and 24 are guided along a common control cam 36, which in the exemplary embodiment shown is formed on a cam piece 38 mounted on the housing and has a contouring with undulatory depressions and elevations for producing the reciprocating motions of the pistons 22 and 24, as described in the document WO 2006/089576 A1, to which reference is made for a detailed description of the piston motion, and the content of which in this regard forms part of the subject matter of the present disclosure. A corresponding control cam 40 on the cam piece 38 is associated with the third piston 26 and the fourth piston.

In FIG. 2 the pistons 22, 24 are shown in a movement position in which they are moved towards one another to the maximum degree. This position is also referred to as the TDC position (top dead center). Starting from this TDC position, the pistons 22 and 24 can move apart as they revolve around the axis of rotation 28 until they reach their BDC position (bottom dead center) in which they are moved apart to the maximum degree (approximately 60° from one another). The third piston 26 and the fourth piston perform movements in the same sense as pistons 22 and 24, that is, in FIG. 2 the third piston 26 and the fourth piston are also in the TDC position. This configuration, in which all four pistons jointly adopt both the TDC position and the BDC position, is suitable for a use of the rotary piston machine 10 as an internal combustion engine. In the case when the rotary piston machine 10 is used as a compressor, however, it is preferred if the pair comprising pistons 22 and 24 adopts its TDC position while the pair comprising the third piston 26 and the fourth piston are just in the BDC position, and vice versa.

In the exemplary embodiment shown here the reciprocating motions of the pistons 22, 24, 26 and the fourth piston are swiveling movements, or movements along a curved path. Alternatively, the reciprocating motions of the pistons may also be movements along a straight path, that is, linear motions, as disclosed in the document WO 2006/128545 A1 of the same applicant. In this case the linear motions of the pistons are oblique with respect to the axis of rotation 28; for example, the linear motions of the pistons may include an angle in the range from 60° to 85°, preferably from 70° to 80°, with the axis of rotation 28.

The pistons 22 and 24 form a first piston pair which defines a first working chamber 42, and the third piston 26 and the fourth piston form a second piston pair which defines a second working chamber 44. In the TDC position of all pistons 22, 24, 26 and the fourth piston shown in FIGS. 2 and 3, the volumes of the working chambers 42 and 44 are at a minimum. In the BDC position the volumes of the working chambers 42 and 44 are correspondingly at a maximum.

The axis of rotation 28 runs through both working chambers 42 and 44, specifically through the centers of the working chambers 42 and 44.

In accordance with the reciprocating motions of the pistons 22, 24, 26 and the fourth piston, the volumes of the working chambers 42 and 44 are decreased and increased periodically.

The working chamber 42 is delimited by an end face 46 of the piston 22 and an end face 48 of the piston 24, and by the piston cage 30, the end faces 46 and 48 being oriented towards one another. The third piston 26 has a corresponding end face 50 which, with the end face (not shown) of the fourth piston oriented towards it, delimits the working chamber 44 in conjunction with the piston cage 30. As can be seen in particular in the case of the third piston 26 in FIG. 2 and in FIGS. 4 and 5, the end faces 46, 48 and 50 are circular, and the bores in the piston cage 30, in which the pistons 22, 24, 26 and the fourth piston are mounted slidingly, are correspondingly circular, as can be seen for the bore 52 for the third piston 26 and the fourth piston.

As a result of the reciprocating motions of the pistons 22, 24, 26 and the fourth piston as they revolve about the axis of rotation 28, the cycles of induction, compression, work (expansion) and exhaust take place in the working chambers 42 and 44.

For the periodic gas exchange into and out of the working chambers 42 and 44 required for the above-mentioned cycles, a gas exchange system 54 is associated with the working chamber 42, as shown in FIG. 1, and a gas exchange system 56 is associated with the working chamber 44.

Since the gas exchange system 54 and the gas exchange system 56 are identical in construction, the following description is confined to the gas exchange system 54.

The gas exchange system 54 comprises a gas inlet 58 fixed to the housing and a gas outlet 60 fixed to the housing, which are represented here by connecting pieces on the housing 12. The piston cage 30 has a gas exchange opening 62 which is arranged on the axis of rotation 28 and is concentric therewith. As shown in FIGS. 4 and 5, the gas exchange opening 62 is continued in a channel 64 in the form of a bore in an axial extension 66 of the piston cage 30, the extension 66 being configured concentrically with the axis of rotation 28, as is apparent in particular from FIG. 3.

As the piston cage 30 revolves about the axis of rotation 28, the channel 64 communicates alternately with the gas inlet 58, as shown in FIG. 4, and with the gas outlet 60, as shown in FIG. 5. In the rotational position of the piston cage 30 shown in FIG. 3, the channel 64 in the extension 66 communicates neither with the gas inlet 58 nor with the gas outlet 60.

For pressure-tight closure of the gas exchange opening 62 in the piston cage 30, a closing member 68 which forms part of the gas exchange system 54 is arranged in the gas exchange opening 62.

Figure 3:
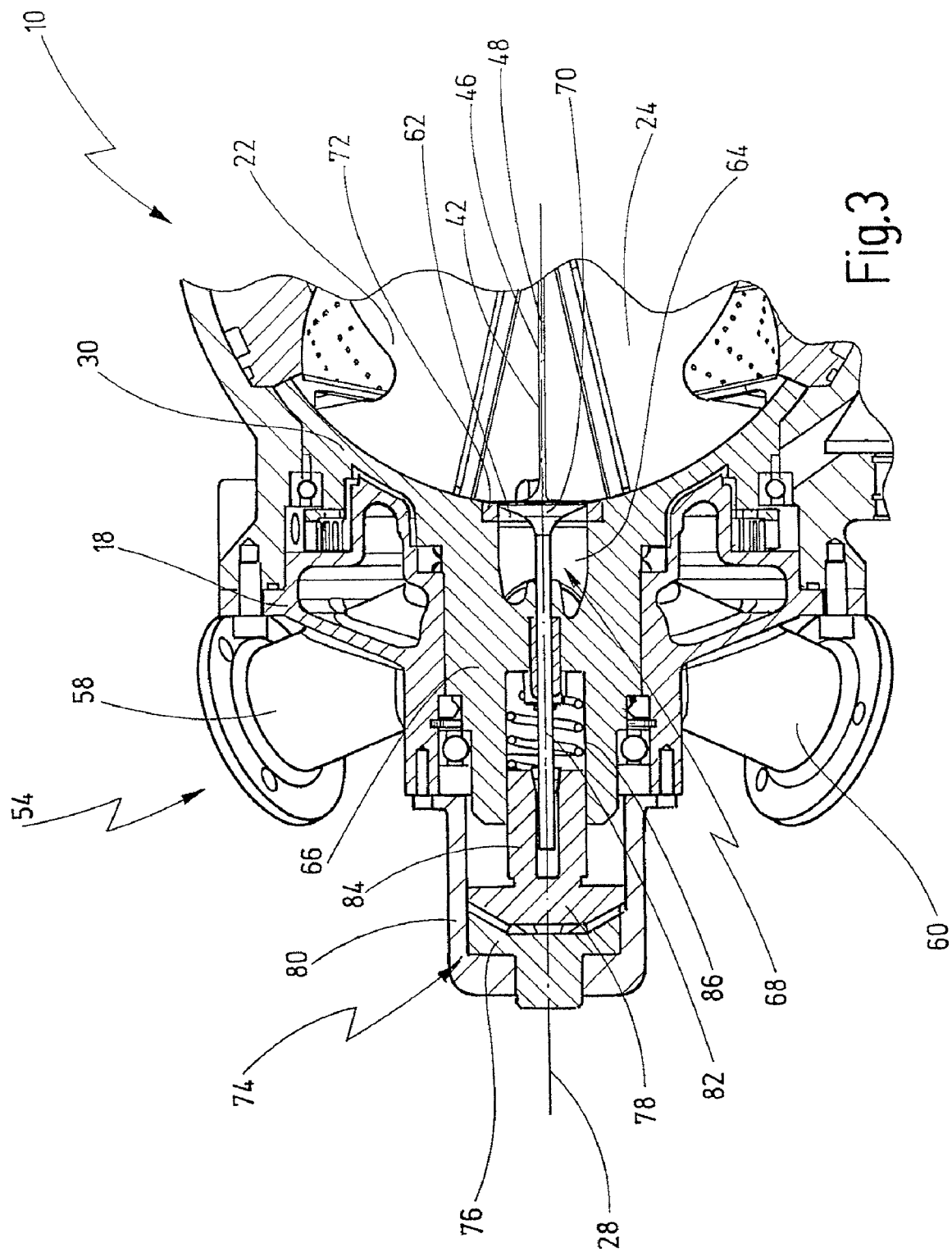
FIG. 3 shows a further portion of the rotary piston machine in FIG. 1 in a longitudinal section with a first embodiment of a gas exchange system.

The closing member 68 is in the form of a disc valve, in the embodiment shown in the form of a tulip valve, and has a valve disc 70 which, in the closed position of the closing member 68, rests against a valve seat 72 formed on the inside of the piston cage 30 at the edge of the gas exchange opening 62. The valve disc 70 and the valve seat 72 are circular or oval. In FIGS. 2 and 3, the closing member 68 is shown in its closed position, in which it closes the gas exchange opening 62 in a hermetically sealed manner with respect to the channel 64 in the extension 66 of the piston cage 30. A gas previously admitted can therefore be highly compressed and, after ignition, expanded with correspondingly high pressure in the working chamber 42.

Starting from its closed position as shown in FIGS. 2 and 3, the closing member 68 can be moved axially in the direction of the axis of rotation 28 to its open position shown in FIGS. 4 and 5, so that, as shown in FIG. 4, gas can be admitted to the working chamber 42 through the gas inlet 58 and, as shown in FIG. 5, can be discharged from the working chamber 42 via the gas outlet 60.

The closing member 68 is connected to the piston cage 30 in a rotationally fixed manner and revolves with the piston cage 30 about the axis of rotation 28, the rotationally fixed connection between the closing member 68 and the piston cage 30 being effected via the extension 66 of the piston cage 30, as will be described later. As the closing member 68 rotates, therefore, the valve disc 70 and the valve seat 72 execute a rotary motion about the axis of rotation 28 in the direction of rotation. By contrast, the closing member 68 is movable relative to the piston cage 30 in the direction of the axis of rotation 28, that is, axially, so that it can be moved from its closed position to its open position and vice versa in accordance with its function.

In order to move the closing member 68 from its closed position shown in FIGS. 2 and 3 to the open position shown in FIGS. 4 and 5, in which the closing member 68 is displaced into the working chamber 42, there is provided for the closing member 68 a control mechanism 74 which derives the axial motion of the closing member 68 from the rotary motion of the closing member 68 about the axis of rotation 28 as the closing member 68 rotates together with the piston cage 30 about the axis of rotation 28.

To this end the control mechanism 74 comprises a control element 76 fixed to the housing and a control element 78 fixed to the closing member. The control element 76 fixed to the housing is arranged in a housing part 80 (cf. FIG. 1) which is connected to the housing end cover 18. In the exemplary embodiment shown in FIGS. 3 to 5, the control element 76 cannot be displaced either axially or in the direction of rotation about the axis of rotation 28.

The control element 78 fixed to the closing member is connected in a rotationally fixed manner to the valve disc 70 of the closing member 68 via a valve stem 82 of the closing member 68. As already mentioned, the closing member 68 is connected in a rotationally fixed manner to the piston cage 30, which connection, in the exemplary embodiment illustrated, is implemented in that the control element 78 has a tappet portion 84 which is received in a form-fitting and therefore non-rotatable, but axially movable, manner in a receptacle 86, contoured in a complementary manner, in the extension 66 of the piston cage 30. In FIGS. 6a) and b) the control element 76 fixed to the housing and the control element 78 fixed to the closing member are shown separately and withdrawn from one another. The tappet portion 84, which is connected integrally to the control element 76 fixed to the housing, is shown here with a square cross section.

Also provided on the control element 76 fixed to the housing is an anti-rotation element in the form of one or more flats 88 which cooperate with corresponding faces in the housing part 80 in order to hold the control element 76 immovably.

The control element 78 fixed to the closing member and the control element 76 fixed to the housing both have a planar configuration, that is, they have control surfaces 90 and 92 oriented towards one another. The control surfaces 90 and 92 extend concentrically around the axis of rotation 28 but are located outside the axis of rotation 28. The control surface 90 is tapered concavely from radially outside to radially inside and the control surface 92 is tapered convexly from radially outside to radially inside, so that the two control surfaces 90 and 92 are substantially complementary to one another.

Formed on the control surface 92 of the control element 78 fixed to the closing member is a control cam 94 fixed to the closing member, which control cam 94 has a first end 96 and a second end 98, viewed in the circumferential direction around the axis of rotation 28, the control cam 94 being axially raised over the remaining part of the control curve 92 between the ends 96 and 98. The transition of this raised portion to the remaining part of the control curve 92 in the region of the ends 96 and 98 has a sinusoidal configuration.

By contrast, the control surface 90 of the control element 76 fixed to the housing has two control cams 100 and 102 fixed to the housing, which control cams 100 and 102 are arranged at a distance from one another, viewed in a circumferential direction around the axis of rotation 28, and each have on the control surface 90 a respective axially raised portion which, like the control cam 94, has a substantially sinusoidal configuration.

In the assembled state shown in FIGS. 2 to 5 the control surfaces 90 and 92 mesh with one another so that, as the control element 78 revolves around the axis of rotation 28, the control cam 92 moves successively past the control cams 100 and 102 and comes into and out of engagement with them, the control element 78 and therefore, via the stem 82, the closing member 68 being pressed or pushed to its open position during each engagement, as shown in FIGS. 4 and 5. The circumferential extension of the control cams 94 and 100 and 102, and the circumferential arrangement of the control cams 100 and 102, are configured according to the time of opening and closing and the duration of the open state of the closing member 68, and to the required lift of the closing member 68.

The restoring of the closing member 68 from its open position to its closed position is effected by an energy storage element 104, for example in the form of a compression spring, which is arranged in the receptacle 86 of the extension 66 of the piston cage 30 and which bears at one end against the tappet portion 84 of the control element 78 fixed to the closing member and at the other against the piston cage 30, so that the closing member 68 is preloaded to its closed position, as shown in FIGS. 2 and 3. The closing member 68 is returned from its open position to its closed position automatically when the control cam 94 of the control element 78 fixed to the closing member moves out of engagement with the control cam 100 or the control cam 102.

Through the provision of two control cams 100 and 102 on the control element 76 fixed to the housing, the closing member 68 is opened twice during a complete revolution of the control element 78 fixed to the closing member 68, once in order to admit a gas to the working chamber 42 (FIG. 4), and once to exhaust gas from the working chamber 42 (FIG. 5).

The above-described control mechanism 74 represents a constructionally very simple possibility of controlling the closing member 68. In this simple configuration the time of the opening and closing, and the duration of opening of the closing member 68, cannot be changed during operation of the rotary piston machine 10.

Developments of this control mechanism in which the control mechanism is adjustable in order to change the time of opening and/or closing of the closing member 68 are described below.

Such a control mechanism 74a is represented in FIGS. 7a) and 7b), the following description being confined to differences from the control mechanism 74.

The difference of the control mechanism 74a from the control mechanism 74 is that the control element 76a fixed to the housing, as shown in FIGS. 9a) to c), has two segments 106 and 108 which together form the control curve 90a, which, accordingly, is divided in half circumferentially to form two segments 106 and 108. The segments 106 and 108 are mounted slidingly on a bearing ring 109.

In this case the control cam 100 is formed on the segment 108 and the control cam 102 on the segment 106.

The two segments 106 and 108 are positionally adjustable in the circumferential direction around the axis of rotation 28 independently of one another, whereby the angular positions of the control cams 100 and 102 with respect to the axis of rotation 28 are adjustable. The adjustment of the angle of the control cam 100 and/or 102 around the axis of rotation 28 changes the time of opening of the closing member 68 and the time of closing of the closing member 68 in the process of admitting gas to the working chamber 42 and/or in the process of discharging gas from the working chamber 42.

Figure 11A:
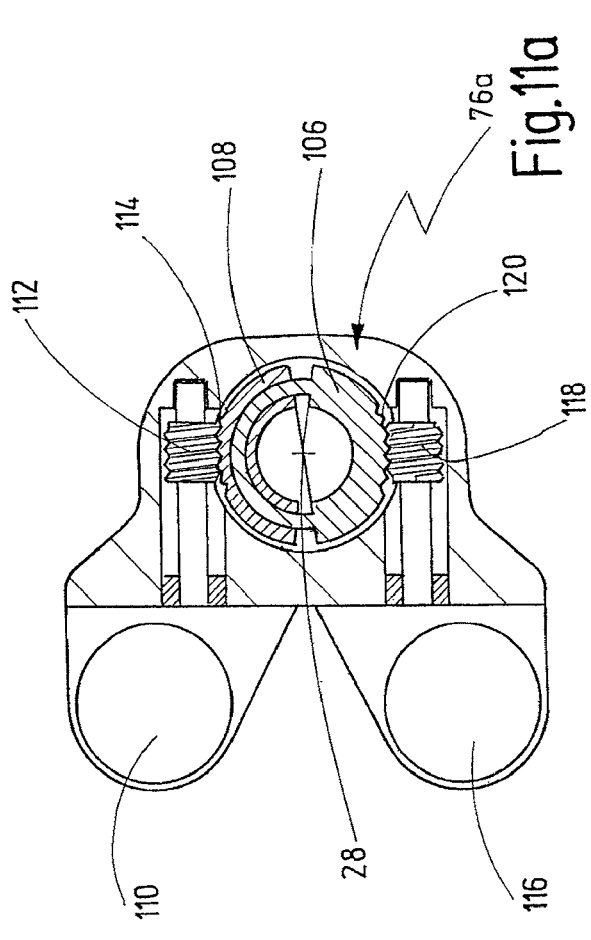
FIGS. 11a) and b) show further details of the control mechanism according to FIGS. 9a to d) in two different views.
Figure 11B:
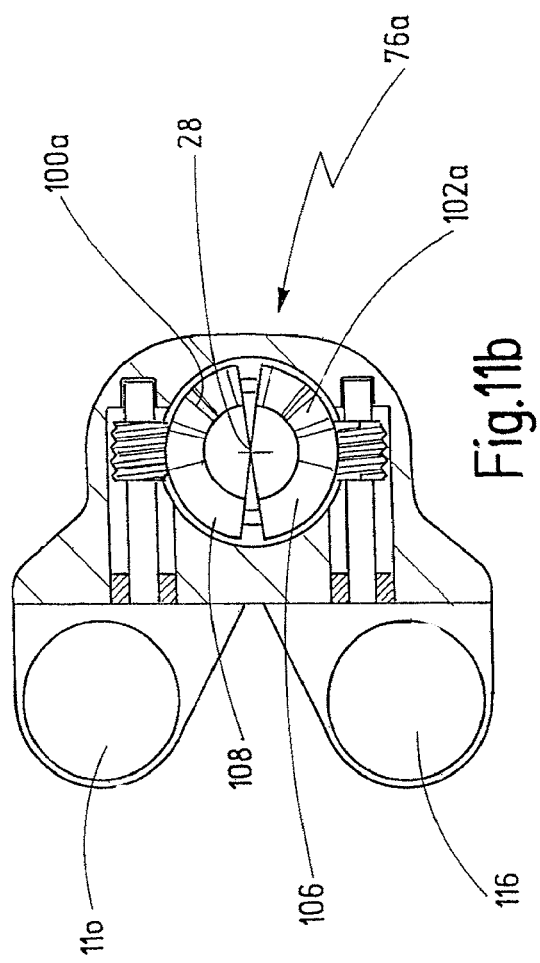

Drives for adjusting the positions of the two segments 106 and 108 of the control element 78a fixed to the housing are represented in FIGS. 11a) and 11b).

To adjust the position of the segment 108 there is provided a drive 110, for example a servomotor, which can drive a worm 112 in two opposite directions of rotation, the worm 112 meshing with an external toothing 114 of the segment 108 and the position of the segment 108 being adjusted clockwise or anticlockwise about the axis of rotation 28 depending on the direction of rotation of the worm 112. The angle of adjustment may be limited to 5° to 20°.

For the segment 106 there is provided a drive 116 which drives a worm 118 which cooperates with an external toothing 120 of the segment 106 in order to adjust the position of the latter about the axis of rotation 28.

The drives 110 and 116 are also shown in FIG. 1.

FIGS. 8a) and b) show a further development of the control mechanism which has a further adjustment possibility for controlling the closing member 68; FIGS. 8a) and b) relate to the gas exchange system 56, which, however, as already mentioned, is identical in design (apart from the angular position with respect to the axis of rotation 28) to the gas exchange system 54.

This control mechanism denoted by reference sign 74b is further adjustable in order to change the lift of the closing member 68 between the closed position and the open position, and to change the duration of the open state of the closing member 68.

For this purpose the control mechanism 74b is able to displace the control element 76b fixed to the housing axially, that is, in the direction of the axis of rotation 28, relative to the control element 78b fixed to the closing member, and therefore to space the control face 90b at a greater or lesser distance from the control face 92b. Through the spacing apart of the control surfaces 90b and 92b, the associated control cams 100b, 102b and 94b are also spaced by a greater or lesser distance from one another, whereby the duration of engagement of these control cams, and therefore the duration of opening of the closing member 68, are shortened or lengthened, as the control element 78b fixed to the closing member revolves around the axis of rotation 28, and likewise the axial stroke of the control element 78b fixed to the closing member, and therefore the lift of the closing member 68 between its closed position and its open position, is increased or decreased.

Figure 10B:
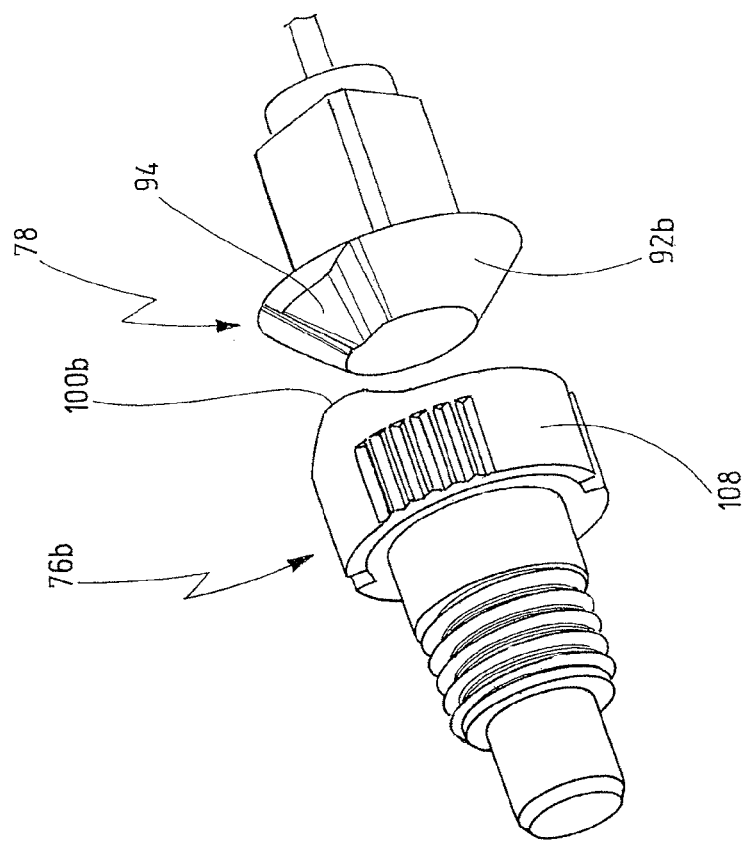
FIGS. 10a) and b) show a control mechanism for a closing member of the gas exchange system of the rotary piston machine according to FIGS. 8a) and b) in two different perspective representations.
Figure 10A:
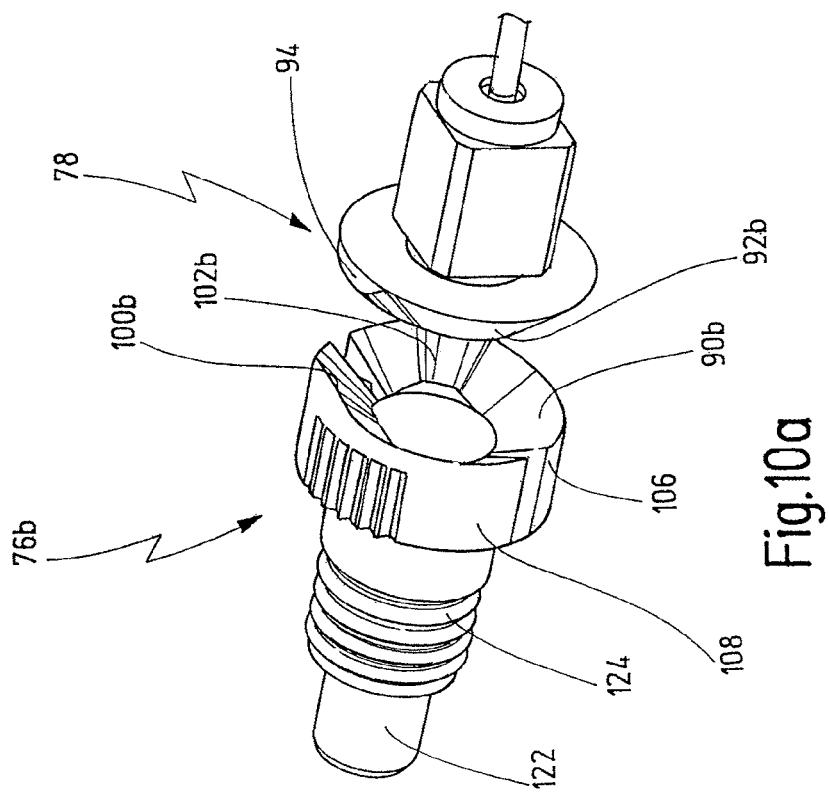

FIGS. 10a) and b) show the control element 76b fixed to the housing, which, as compared to the control element 76a fixed to the housing, has an axial extension 122 with a thread 124.

Figure 12:
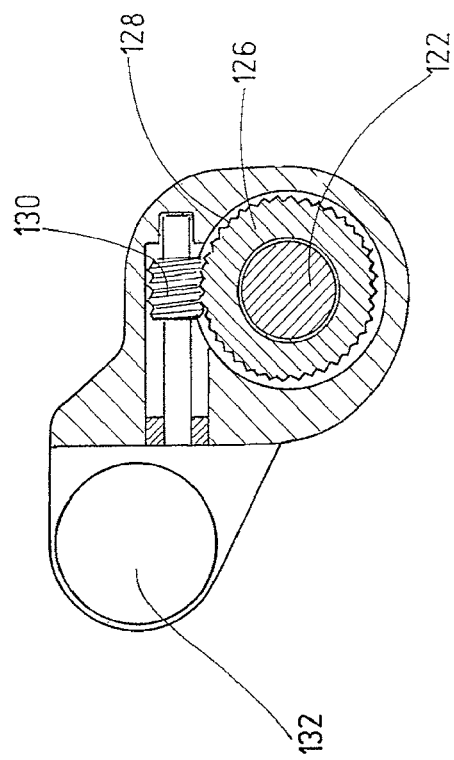
FIG. 12 shows further details of the control mechanism according to FIGS. 10a) and b)

As shown FIG. 12, an intermediate wheel 126 meshes with this thread, which intermediate wheel 126 is axially immovable and has an external toothing 128 with which a worm 130, set in rotation by a drive 132, meshes. The drive 132 is also shown in FIG. 1.

The operation of the gas exchange system 54 is described below with reference to FIG. 13.

FIG. 13f) shows the control element 76b fixed to the housing viewed from the direction of the working chamber 42, which control element 76b is subdivided, for the purposes of the following description, into four sectors 1, 2, 3 and 4, each extending over approximately 90°. An arrow 131 indicates the direction of revolution of the control element 78b fixed to the closing member about the axis of rotation 28. R denotes the maximum range of positional adjustment of the segments 106 and 108 with the control cams 100b and 102b in a circumferential direction about the axis of rotation 28, which range is approximately 15°.

FIG. 13a) shows the control element 76 fixed to the housing and the control element 78 fixed to the closing member each in an unrolled representation, the left-hand ends in FIG. 13a) of the control elements 76, 78 adjoining the respective right-hand ends.

FIG. 13a) relates to the simplest case of the control mechanism 74 without adjustment possibilities for the control cams 100 and 102 fixed to the housing. FIG. 13a) shows the control element 78 fixed to the closing member with its control cam 94 fixed to the closing member in a rotational position about the axis of rotation 28 in which the control cam 94 is just at the transition from sector 4 to sector 1 of the control element 76 fixed to the housing. In this rotational position of the control element 78 fixed to the closing member, the closing member 68 is closed. In the working chamber 42 the working cycle of work (expansion) has just ended. The pistons 22 and 24 are in the BDC position. As the control element 78 fixed to the closing member with the control cam fixed to the closing member runs along the control element 76 fixed to the housing in the direction of an arrow 132, the control cam 94 fixed to the closing member first runs up the control cam 100 fixed to the housing, whereby the closing member 68 is opened, while the pistons 22, 24 move towards one another from their BDC position in the direction of their TDC position. The working cycle of the discharge of gas from the working chamber 42 through the gas outlet 60, as shown in FIG. 5, now takes place. At the end of sector 1 the closing member 68 automatically closes as a result of the preload by means of the energy storage element 104. The pistons 22, 24 are now in the TDC position in which the working chamber 42 has its minimum volume, as shown in FIG. 3.

Immediately thereafter the control cam 94 fixed to the closing member runs up the control cam 102 fixed to the housing and the closing member 68 is again opened in order now to admit gas into the working chamber 42 through the gas inlet 58, as shown in FIG. 4. At the end of sector 2 the closing member 68 is closed again. As the control cam 94 fixed to the closing member then runs along sectors 3 and 4 of the control element 76 fixed to the housing, the closing member 68 is closed and the working cycle of compression first takes place in the working chamber 42, starting from the BDC position of the pistons 22, 24, and then, starting from the TDC position of the pistons 22, 24, the working cycle of work takes place again. The pistons 22, 24 have then, starting from the left-hand end in FIG. 13a) up to the end in FIG. 13a), revolved through a total of 360° about the axis of rotation 28 together with the piston cage 30 in the housing 12.

FIGS. 13b) to d) show the same operation as in FIG. 13a), but now for the control element 76a fixed to the housing, which permits positional adjustment of the control cams 100a and 102a fixed to the housing about the axis of rotation 28, in order to change the times of opening and closing of the closing member 68.

FIG. 13b) shows a setting of the control element 76a fixed to the housing in which the segment 108 has been displaced about the axis of rotation 28 in such a manner that the working cycle of discharge (sector 1) begins earlier while the time of the start of admission is unchanged, that is neutral. O denotes the duration of the open position of the closing member 68.

FIG. 13c) shows a positional adjustment of the control element 76a fixed to the housing whereby the segment 108 of the control element 76a has been displaced about the axis of rotation 28 in an opposite manner to FIG. 13b), such that the working cycle of discharge begins later, while the timing of admission continues to be unchanged.

FIG. 13d) shows an operating state in which the segment 106 has now been displaced about the axis of rotation 28 while the segment 108 is in a neutral position. The time of the start of discharge is therefore unchanged with respect to the neutral position while admission begins earlier with respect to the neutral position.

FIG. 13e) shows the operation of the gas exchange system in the case of use of the control element 76b fixed to the housing which is adjustable axially in the direction of the axis of rotation 28 relative to the control element 78 fixed to the closing member. FIG. 13e) shows an axial position of the control element 76b fixed to the housing in which it is spaced further from the control element 78 fixed to the closing member, as compared to the representations in FIGS. 13a) to d). The result is that the control cam 94 fixed to the closing member is in engagement with the respective control cams 100b and 102b fixed to the housing for a shorter period, and that the stroke of the control element 78 fixed to the closing member, and therefore the lift of the closing member 68, is also reduced. FIG. 13e) shows, in particular, an operating position of the control element 76b fixed to the housing in which the duration $O_1$ of discharge is reduced because the duration of engagement of the control cam 94 fixed to the closing member with the control cam 100b fixed to the housing has been shortened. The control cam 102b fixed to the housing has additionally been displaced in a direction around the axis of rotation 28 in such a manner that the time of admission is later with respect to the neutral position, and at the same time the duration $O_1$ of admission is shorter than in the neutral position because of the axial displacement of the control element 76b fixed to the housing.

The operation of the gas exchange system 56 associated with the working chamber 44 is the same, with the sole difference that the working cycles of work, discharge, admission and compression are phase-shifted by two working cycles as compared to the gas exchange system 54. While the working cycle of work is just taking place in the working chamber 42, the working cycle of induction, etc., is taking place in the working chamber 44.

Figure 14B:
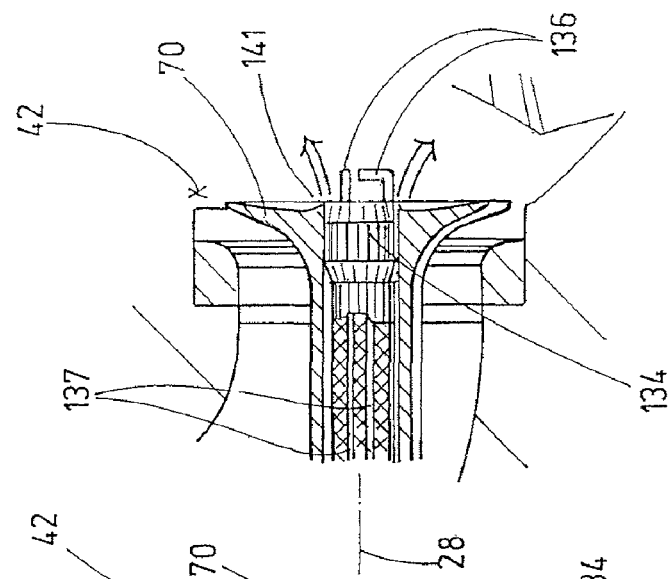
FIG. 14 is a representation comparable to FIG. 4 in a further modification of the gas exchange system with a closing member with integrated ignition device.
Figure 14A:
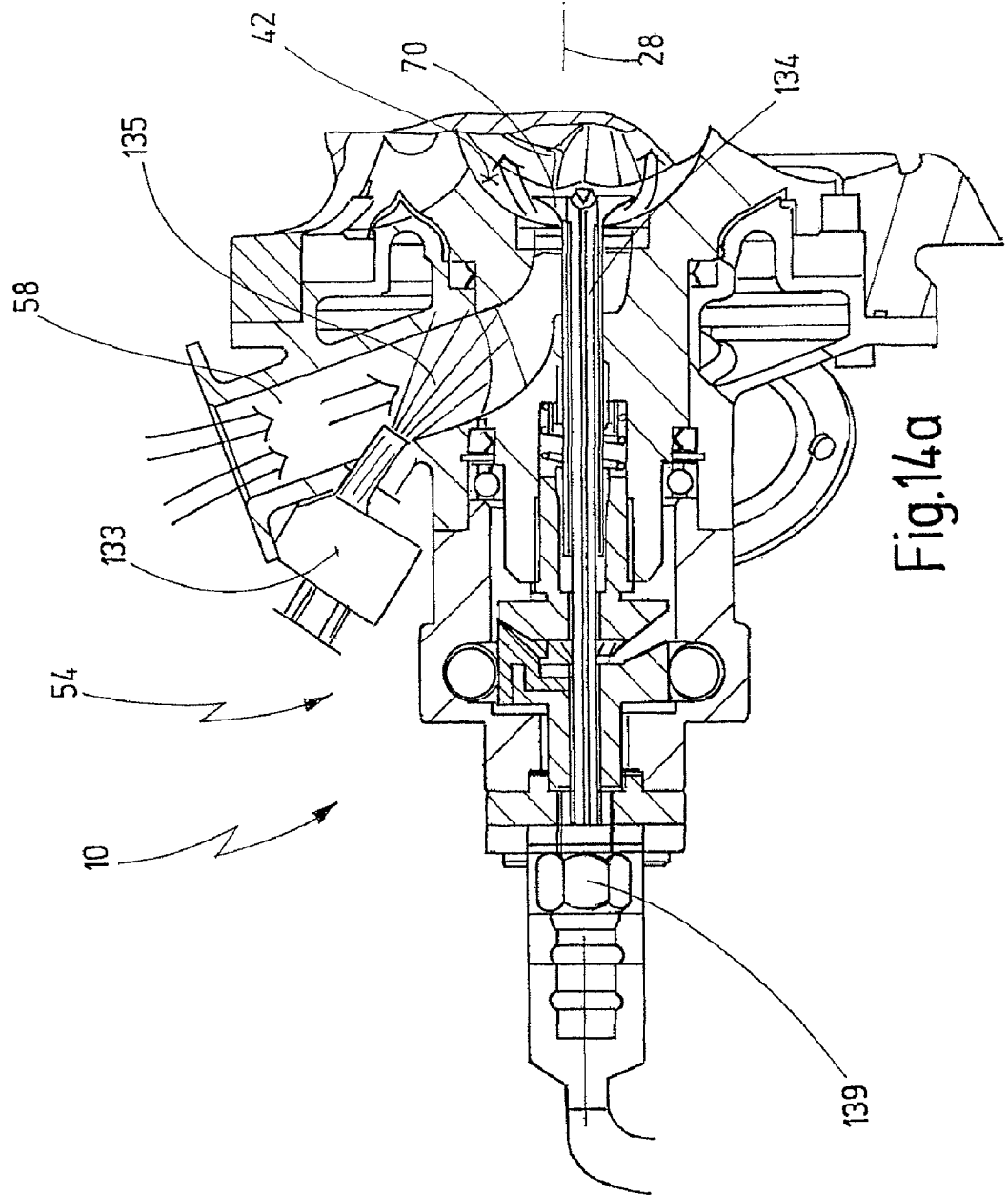

FIGS. 14a) and b) show a variant of the closing member 68 which is suitable for the use of the rotary piston machine 10 as an internal combustion engine which can be operated with gasoline. For this purpose a fuel injection nozzle 133, through which fuel 135 can be injected into the gas inlet 58, is integrated in the gas inlet 58, so that, with the closing member 68 open, a gas which is a mixture of air and fuel can be admitted to the working chamber 42. In order to ignite the gas in the working chamber 42, an ignition device 134, the ignition electrodes 136 of which are arranged in immediate proximity to the axis of rotation 28, is integrated in the closing member 68.

The ignition electrodes 136 are at the level of the valve head 70. For this purpose the valve stem 82 of the closing member 68 is configured as a hollow tube in which the ignition device 134 is arranged in a fixed manner with respect to the axis of rotation 28; that is, the ignition device 134 does not rotate together with the valve stem 82 and the valve head 70 about the axis of rotation 28. The ignition device 134 or spark plug has electric supply lines which extend to a cable connection 139. In this case the ignition device 134 passes through the control elements 76 and 78 (or 76a or 76b). Optionally, compressed air 141 may be injected into the working chamber through the gap between the ignition device 134 and the stem 82 in order to prevent blowback of the burning gas.

Figure 15:
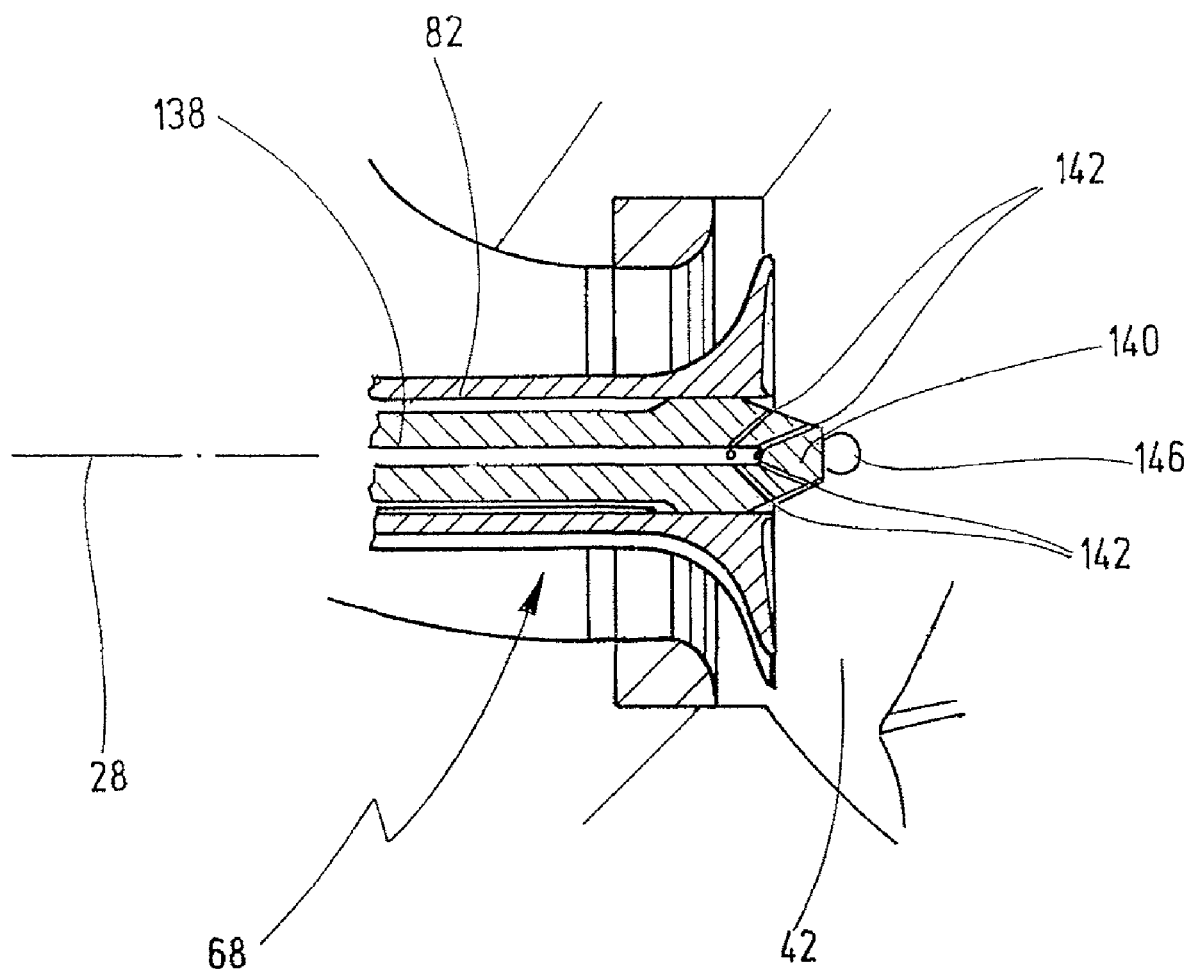
FIG. 15 shows a portion of a gas exchange system in the region of a closing member with integrated fuel injection.

FIG. 15 shows a further modification of the closing member 68 which is especially suited to a use of the rotary piston machine 10 as a diesel engine.

A fuel injection device 138 extends through the valve stem 82, again in the form of a hollow tube, of the closing member 68, at the working-chamber end of which fuel injection device 138 is arranged an injection nozzle 140 with a plurality of fine nozzle orifices 142 through which diesel fuel can be injected into the working chamber 42 under very high pressure. The fuel injection device 138 is again preferably arranged in the valve stem 82 in a fixed manner with respect to the axis of rotation 28. A glow wire 146 may be arranged on the fuel injection device 138. The fuel injection device 138 extends through the stem 82 and through the control elements 78 and 76 (or 76a or 76b) up to an injection valve (not shown in detail).

These exemplary embodiments show that, despite the presence of the closing member 68 on the axis of rotation 20, it is possible to use the rotary piston machine 10 as an internal combustion engine, specifically both as a spark-ignition and as a diesel engine.

What is claimed is:

1. A rotary piston machine, comprising
   a housing,
   at least two pistons arranged in said housing and being able to revolve together in said housing about an axis of rotation which is fixed with respect to said housing,
   a piston cage arranged in said housing, in which said at least two pistons are mounted slidingly, said piston cage revolving together with said at least two pistons about said axis of rotation, said at least two pistons executing mutually opposing reciprocating motions while revolving about said axis of rotation in order to alternately increase and decrease the volume of a working chamber defined by end faces of said at least two pistons which are oriented towards one another, and by said piston cage, said axis of rotation running through said working chamber,
   said piston cage having a gas exchange opening for the admission and discharge of gas to and from said working chamber, said gas exchange opening being arranged on said axis of rotation,
   a closing member arranged in said gas exchange opening which is connected to said piston cage in a rotationally fixed manner with respect to said axis of rotation and being axially movable relative to said piston cage in direction of said axis of rotation in order to open and close said gas exchange opening, and
   a control mechanism for said closing member which derives an axial motion of said closing member from a rotary motion of said closing member about said axis of rotation.

2. The rotary piston machine of claim 1, wherein said closing member is in the form of a disc valve having a valve disc which rests against a valve seat formed inside said piston cage in a closed position of said closing member, and which is movable in direction into said working chamber in order to open said gas exchange opening.

3. The rotary piston machine of claim 2, wherein said closing member is in the form of a tulip valve.

4. The rotary piston machine of claim 1, wherein said control mechanism comprises at least one control cam fixed to said closing member and at least one control cam fixed to said housing and cooperating with said control cam fixed to said closing member in such a manner that said closing member is moved from a closed position to an open position as said control cam fixed to said closing member runs along said control cam fixed to said housing.

5. The rotary piston machine of claim 4, wherein said control mechanism has one control cam fixed to said closing member and two control cams fixed to said housing and arranged at a distance from one another in a circumferential direction.

6. The rotary piston machine of claim 4, wherein said control mechanism has two control cams fixed to said closing member and arranged at a distance from one another in a circumferential direction and one control cam fixed to said housing.

7. The rotary piston machine of claim 4, wherein said at least one control cam fixed to said closing member is formed in a margin region of a planar control element fixed to said closing member, and said at least one control cam fixed to said housing is arranged in a margin region of a planar control element fixed to said housing and located opposite said planar control element fixed to said closing member.

8. The rotary piston machine of claim 7, wherein said planar control element fixed to said housing has a concavely tapered control surface, and said planar control element fixed to said closing member has a convexly tapered control surface substantially complementary to said concavely tapered control surface, and wherein said control cams are formed on said convexly and concavely tapered control surfaces.

9. The rotary piston machine of claim 1, wherein said control mechanism is adjustable in order to change at least one of a time of opening of said closing member and a time of closing of said closing member.

10. The rotary piston machine of claim 4, wherein said at least one control cam fixed to said housing is positionally adjustable in a circumferential direction about said axis of rotation.

11. The rotary piston machine of claim 5, wherein said two control cams fixed to said housing are positionally adjustable in a circumferential direction.

12. The rotary piston machine of claim 11, wherein said two control cams fixed to said housing are positionally adjustable in said circumferential direction independently of one another.

13. The rotary piston machine of claim 7, wherein said control element fixed to said housing has two segments which each have one of said control cams fixed to said housing, said two segments being positionally adjustable relative to one another in a circumferential direction about said axis of rotation.

14. The rotary piston machine of claim 7, wherein said control element fixed to said housing has two segments which each have one of said control cams fixed to said housing, said two segments being positionally adjustable jointly in a circumferential direction about said axis of rotation.

15. The rotary piston machine of claim 1, wherein said control mechanism is adjustable in order to change a duration of an open state of said closing member.

16. The rotary piston machine of claim 1, wherein said control mechanism is adjustable in order to change a lift of said closing member between a closed position and an open position of said closing member.

17. The rotary piston machine of claim 4, wherein said at least one control cam fixed to said housing is axially displaceable in direction of said axis of rotation relative to said at least one control cam fixed to said closing member.

18. The rotary piston machine of claim 1, wherein said control mechanism has an energy storage element for axially returning said closing member from an open position to a closed position.

19. The rotary piston machine of claim 1, wherein said gas exchange opening is formed in an axial extension of said piston cage, which gas exchange opening opens into a channel in said extension which leads laterally outwards from said extension and communicates alternately with a gas inlet of said housing and with a gas outlet of said housing as said piston cage revolves about said axis of rotation.

20. The rotary piston machine of claim 1, wherein a fuel injection device is arranged in said closing member.

21. The rotary piston machine of claim 1, wherein an ignition device for igniting a gas in said working chamber is arranged in said closing member.

* * * * *